Aug. 20, 1968   D. J. SHARP   3,397,446
THIN FILM CAPACITORS EMPLOYING SEMICONDUCTIVE
OXIDE ELECTROLYTES
Filed July 9, 1965
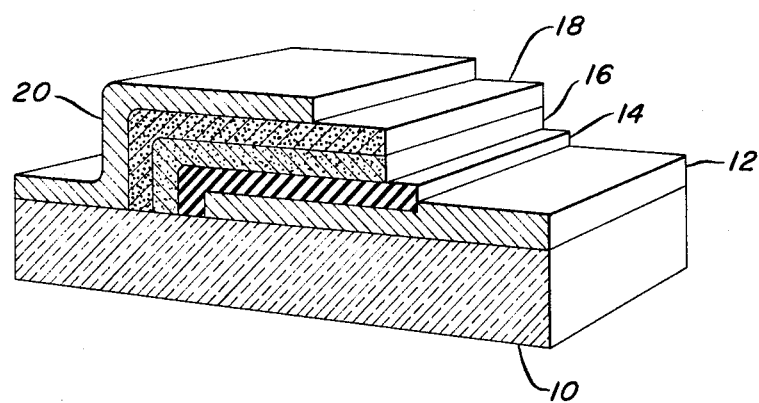
INVENTOR
D. J. SHARP
BY  FLYNN, MARN &
   JANGARATHIS
ATTORNEY

United States Patent Office 3,397,446
Patented Aug. 20, 1968

3,397,446
**THIN FILM CAPACITORS EMPLOYING SEMICON-
DUCTIVE OXIDE ELECTROLYTES**
Donald Jex Sharp, Princeton, N.J., assignor to Western
Electric Company, Incorporated, New York, N.Y., a
corporation of New York
Filed July 9, 1965, Ser. No. 470,762
9 Claims. (Cl. 29—570)

ABSTRACT OF THE DISCLOSURE

A stable and high oxidation state oxide of manganese ($MnO_2$) is deposited on an anodically produced dielectric oxide layer ($Ta_2O_5$) which in turn resides on a first capacitor electrode layer (Ta) by first immersing the oxide layer in a dilute solution of potassium permanganate at room temperature. The solution is acidified by the addition of an oxidizing acid having the formula $HNO_x$, where $x$ is either 2 or 3, to reduce and precipitate the $MnO_2$ onto the oxide layer. The solution may be agitated during precipitation.

Lastly, a graphite layer and a counter-electrode may be added to produce a self-healing, low noise, low dissipation factor, low leakage current, high capacitance capacitor.

---

This invention relates generally to a technique for the fabrication of thin film capacitors utilizing a film-forming metal on a substrate as one of the electrodes, an oxide layer of the film-forming metal as the dielectric, a solid semiconductive oxide "electrolyte," and an electrically conductive counter-electrode, and also relates to capacitors produced by such techniques. More particularly, the invention relates to thin film tantalum capacitors wherein the tantalum is oxidized on its surface as by anodizing or by thermal means, the oxide is covered with a layer of manganese oxide, and this is in turn covered by a conductive body which acts as a second electrode. The process of the invention features a novel method of applying the manganese oxide layer over the anodized layer. As used herein, the term "thin film" is intended to mean a film of less than one micron (10,000 A.) thickness. Film-forming, or anodizable metals include tantalum, niobium, silicon, aluminum, titanium, zirconium and alloys thereof.

Film-forming metals have been employed in the fabrication of three general types of capacitors. The wet electrolytic capacitor uses an anodized electrode of such a metal immersed in a suitable liquid electrolyte, the container which holds the anodized electrode and electrolyte typically serving as the second electrode of the capacitor.

The second type of capacitor using film-forming metals is the solid electrolytic capacitor. This type of capacitor generally takes the form of an anodized porous compact or slug of tantalum or another film-forming metal which is impregnated successively with a layer of manganese dioxide and a layer of an electrically conductive metal as the second electrode. The manganese dioxide employed in this device facilitates the healing or rebuilding of discontinuities or defects in the dielectric oxide film. Capacitors of this general type, and the healing effect of the manganese dioxide are described in U.S. Patent No. 3,093,883 and U.S. Patent No. 3,166,693, assigned to Bell Telephone Laboratories, Inc.

The third type of capacitor employing film-forming metals is known as the printed or thin film capacitor, and is constructed by depositing a layer of a film-forming metal, such as tantalum, on a substrate, as for example by sputtering or vacuum evaporation, anodizing or thermally oxidizing the deposited layer to form an oxide film, and either depositing a counter-electrode in direct contact with the anodized film or providing an intermediate layer of manganese dioxide between the anodized film and the counter-electrode. Use of the manganese dioxide layer is preferred, inasmuch as this increases the reliability of the device, because of the healing properties noted above in connection with the porous compact capacitors.

The present invention relates to a novel method for applying a manganese oxide layer to thin film capacitors, which method is both simple and more economic than methods heretofore employed, and which results in an improved product. It is to be understood that many semiconductive materials are operable in the invention, although only manganese oxide is referred to herein. This material is preferred due to the ease with which it can be deposited, its relatively low electrical resistance, and the well defined but poorly understood healing effect whereby electrical currents occurring at point breakdowns in the dielectric oxide film are reduced.

Insofar as is known, the healing effect of manganese dioxide is caused by the local conversion of $MnO_2$ to the poorly conductive lower oxide, $Mn_2O_3$. Manganese dioxide has a negative temperature coefficient of resistance up to a critical temperature where the transformation to the lower oxide occurs, about 750° F. (400° C.). After that, resistance increases rapidly as the lower oxide is formed. It has been determined, moreover, that the resistance of $MnO_2$ at a point contact will drop very rapidly with slowly increasing voltage, but suddenly and immediately rises to a very high value at a certain point.

The rapid increase in resistance of $MnO_2$ at a critical temperature appears to explain the phenomenon observed with a point contact. It indicates that a mechanism involving heat at the point contact is responsible for the sharp change in resistance. It is likely that at some point immediately below the transition point, the conditions for a current-temperature feedback are met, resulting in a thermal "run away"; this is terminated only by a phase change to a less conductive or relatively insulating oxide of manganese. Thus, the healing action of $MnO_2$ in capacitor structures would seem to be relatively independent of the capacitor or dielectric oxide material. Manganese dioxide has been used with the same beneficial effect in other capacitor systems, such as aluminum-oxide, niobium-oxide and silicon-oxide, which appears to confirm this.

The above-described healing effect has one distinct drawback. Each time a defect in the dielectric film is "healed" by reduction of the manganese dioxide, a distinct "flicker" or electrical instability of the capacitor is observed. This noise makes such capacitors less desirable for use in computers or other low-noise applications.

Heretofore, the method of choice for producing the manganese dioxide coating has been by pyrolytic decomposition of manganous nitrate. Typically, the anode is brushed with or immersed in a relatively dilute solution of this material, and the wet anode is then heated to 300°–500° C. The operation is repeated as required. More recently, $MnO_2$ layers have been deposited on thin film capacitors by initially heating the anodic substrate to the required temperature and then spraying a relatively concentrated manganous nitrate solution thereon. Decomposition occurs on contact, resulting in an improved device.

While the pyrolytic decomposition of manganous nitrate produces what is believed to be a nearly stoichiometric deposit of $MnO_2$, there are certain disadvantages to this method. In particular, the high temperature required for the decomposition reaction requires that a re-anodizing step be performed in an aqueous electrolyte to heal imperfections in the tantalum oxide layer, the necessary oxygen coming from the manganese oxide layer and the electrolyte. This is followed by a re-impregnation to form additional manganese dioxide. Also, the manganese oxide film, although quite adherent, has a microscopically rough surface which increases the difficulty of applying a counter-electrode thereto. This is not a serious problem, however, and may be overcome by either increasing the thickness of the counter-electrode layer or employing an intermediate layer of colloidal graphite. In general, the use of a colloidal graphite layer has been found to be beneficial because in addition to improving electrical contact, it has no structural integrity of its own, and it blocks transmission of thermal and/or mechanical stresses which might otherwise damage the capacitor.

As between dipping the tantalum anode in the manganous nitrate solution followed by heating, and spraying the solution onto a heated anodized substrate, the latter method has been preferred, because the $MnO_2$ deposit, while relatively thick and porous, is characterized by a lower resistance (in the order of 0.1 to 200Ω cm.).

It is thus a general object of the present invention to provide an improved method for the production of thin film capacitors which overcomes the foregoing problems inherent in presently employed processes, and which produces an improved capacitor product.

Another object of the invention is to provide an improved method of producing semiconductive coatings on thin film, anodized capacitor substrates.

Yet another object of the present invention is to provide a thin film capacitor having a solid semiconductive oxide electrolyte which has better properties than capacitors of the same general type now available.

Various other objects and advantages of the invention will become clear from the following description of several embodiments thereof, and the novel features will be particularly pointed out in connection with the appended claims.

In essence, the present invention involves the deposition of manganese oxide coatings by the in situ reduction and precipitation of potassium permanganate from a dilute solution. While the coatings produced in accordance with the invention may be referred to as $MnO_2$, it is to be noted that the exact stoichiometry of the layer is not known, and resistance measurements appear to indicate that the layer is a mixture of $MnO_2$ and lower oxides. Further, the oxide films are thinner and have a higher resistance than films which are pyrolytically decomposed. While not wishing to be bound by any particular theory or explanation for the improved properties of capacitors made in accordance with the invention, it is believed that the thinner manganese oxide layers having somewhat higher specific resistance which the present method produces does account for the improvements.

The method of the invention comprises immersing the anodized substrate in a potassium permanganate solution, acidifying the solution with a suitable acid, such as nitric or nitrous acid, and allowing the following reaction to proceed:

$$KMnO_4 + HNO_3 \rightarrow Mn_xO_y + KNO_3 + H_2O$$

During reduction of the permanganate solution, agitation thereof should be provided, as for example with a magnetic stirrer, so that fresh solution is brought into contact with the substrate. Nitric or nitrous acid, or mixtures thereof, are preferred, because they do not dissolve the pecipitating manganese oxide. The only requirement is that the permanganate be reduced; other acids, certain alcohols and even, with time, air can do the job.

After deposition of the manganese oxide layer the substrate is washed in water, to remove residual solution, and dried, to remove the water. Construction of the capacitor is then complete with the application of a graphite layer (if desired), a conductive counter-electrode layer, and suitable leads. As no heating step is employed, the reanodizing and re-impregnation steps heretofore necessary are eliminated.

Manganese oxide layers produced in accordance with the invention are very smooth, compared to layers produced by pyrolytic decomposition of manganous nitrate. The manganese oxide layer is also very adherent to the anodized substrate, and provides a surface to which the graphite or counter-electrode metal will readily adhere. Of course, the most distinct advantage of producing manganese oxide layers by the method of the invention is that the underlying anodized surface is not damaged in any way, since the process is carried out entirely at or near room temperature.

As noted above, the manganese oxide layers deposited from permanganate solutions have a higher specific resistance than pyrolytically decomposed layers, due probably to the presence of a mixture of $MnO_2$ and lower oxides. While the effect of this suspected difference in composition on the healing effect is not known, capacitors produced in accordance with the invention exhibit less of the "flicker" or instability previously associated with capacitors of this type. Yet, as detailed in the examples, other properties of the capacitors are as good or better than those of capacitors with pyrolytically decomposed $MnO_2$. In particular, capacitance is somewhat higher and the dissipation factor is considerably less. Moreover, both dissipation factor and leakage were found to decrease with age, and capacity stability was much better.

Understanding of the invention will be facilitated by referring to the following discussion and the accompanying drawing, which is a cross-sectional view of a thin film capacitor made in accordance with the invention.

With reference to the drawing, the structure of a typical thin film capacitor is seen to comprise a suitable substrate 10 of glass, glazed ceramic or the like, upon which is deposited a layer of a film-forming metal 12 such as tantalum, niobium, aluminum, silicon, etc., which layer is the anode of the capacitor. An oxide layer 14 of the metal 12 is formed in situ as by anodizing, heating in air or by other suitable means. This layer is the insulating dielectric of the capacitor. A layer of manganese oxide 16 is then deposited over layer 14 by chemical reduction and precipitation from a solution as described above. A graphite layer 18, is optionally applied, preferably from a colloidal solution, to insure good electrical contact and provide a measure of protection against stress and strain. Lastly, a conductive, counter-electrode or cathode layer 20 is applied. This may be gold, silver or any conductor which can be applied in a manner which makes good contact with the underlying layer. Vacuum evaporation and sputtering techniques are satisfactory. Suitable leads (not shown) are attached to the anode 12 and cathode 20 prior to use.

It is to be noted that the structure illustrated in the drawing differs from prior art devices only in the manganese oxide layer; the novel method of depositing this layer produces an improved capacitor. The extent of improvement is clear from the examples set forth hereinbelow, which are intended to be illustrative only and should not be interpreted in a limiting sense.

EXAMPLES

Thirty-two thin film capacitors were prepared on a glass substrate. Tantalum was applied to the substrate by sputtering (the thickness of the tantalum is unimportant).

The tantalum was anodized in a 0.01% citric acid solution at room temperature. Anodizing potential was brought to 130 volts over a one-half hour period and the tantalum was aged for another half-hour at this voltage. The anodized layer was then back-etched in accordance with the procedure described in U.S. Patent No. 3,156,633, assigned to Bell Telephone Laboratories, Inc., and then anodized again at 130 volts for one-half hour. The resulting $Ta_2O_5$ layer was about 2000 A. thick.

The maganese oxide layer was then applied. The substrate was immersed in a 0.1 M potassium permanganate solution. Concentrated $HNO_3$ was then added in an amount equal to 20% of the volume of permanganate solution. The acidified solution was agitated with a magnetic stirrer. In various tests, deposition of manganese oxide was carried out for from 10 to 20 minutes and this was not found to be critical; it is only necessary to remove the substrate before a scaly manganese oxide appears. Thickness of the manganese oxide layers varied from 800 A. to 1200 A. After removal from the solution, the assembly was washed in deionized water and dried.

A layer of a Kodak photoresist was applied in the conventional manner and a pattern was shaped so as to form thirty-two capacitors. Unprotected manganese oxide was removed by etching with a dilute aqueous solution of $HNO_3$ and $H_2O_2$ (about 2–5% of each), after which the assembly was washed in deionized water and dried. Residual photoresist was removed with a conventional solvent.

A gold counter-electrode was applied by vacuum evaporation, using conventional masking procedures. In this instance, a graphite layer was not applied, inasmuch as the very smooth manganese oxide layer of the invention provides an adequate surface for contact by the counter-electrode.

Capacitance and dissipation factor tests were conducted with a General Radio Co. Capacitance-DF bridge. Results, including capacitance, dissipation factor, and leakage current, are summarized below in Table I. It will be noted that the capacitors had more than 95% of the theoretical capacitance possible for an anodizing voltage of 130 volts.

TABLE I.—THIN FILM CAPACITORS

| | Range | Average |
|---|---|---|
| Capacitance, $\mu f.$ at 130 v. per cm.$^2$ | .01–.015 | 0.012 |
| Dissipation Factor (1,000 c.p.s.), percent | 0.007–0.015 | 9.3 0.011 |
| Leakage current, amps at 50 v. | $10^{-9}$–$10^{-10}$ | $10^{-9}$ |
| Temperature coefficient of capacitance (30–60° C.), p.p.m. per °C | 600–670 | 640 |

Leakage current decreased on aging of the capacitors, as did the dissipation factor. It is felt that the removal of trace amounts of moisture with time contributed to the latter effect. In life tests (300 hours), the capacitors were characterized by improved capacity stability, predictable and uniform leakage currents, and low noise, as compared to similar capacitors having pyrolytic manganese oxide.

Various changes in the details, steps, materials and arrangements of parts, which have been herein described and illustrated in order to explain the nature of the invention, may be made by those skilled in the art within the principle and scope of the invention as defined in the appended claims.

What is claimed is:

1. A process for the fabrication of a thin film capacitor that comprises:
   depositing a layer of a film-forming metal on a suitable substrate as a first electrode;
   forming a dielectric oxide layer on said metal layer;
   forming a layer of a solid, semiconductive oxide of manganese in intimate contact with said dielectric oxide layer by reduction and precipitation of said oxide onto said dielectric oxide layer from a dilute solution of potassium permanganate acidified with nitric acid; and
   depositing a counter-electrode upon and in intimate contact with said semiconductive layer.

2. A process as defined in claim 1, wherein said dielectric oxide layer is formed by anodizing said metal layer.

3. A process as defined in claim 1, and additionally comprising forming a layer of graphite on said semiconductive layer before depositing said counter-electrode.

4. A process as defined in claim 1, and additionally comprising agitating said solution during reduction and precipitation of said semiconductive oxide of manganese.

5. A process for producing a thin film tantalum capacitor comprising:
   depositing a layer of tantalum on a suitable substrate, said tantalum forming a first electrode of said capacitor;
   anodizing said tantalum to form a dielectric layer of tantalum oxide thereon;
   depositing a layer of manganese oxide on and in intimate contact with said dielectric layer by reduction of potassium permanganate in solution to manganese oxide and precipitation thereof onto said dielectric layer, said solution being acidified with nitric acid, said reduction and precipitation being carried out at ambient temperature; and
   depositing an electrically conductive layer on said manganese oxide layer, said electrically conductive layer forming a second electrode of said capacitor.

6. A process as defined in claim 5, and additionally comprising forming a layer of graphite on said manganese oxide layer before depositing said second electrode.

7. A process of fabricating a capacitor comprising the steps of:
   (a) depositing a layer of a film-forming material on a substrate;
   (b) forming a dielectric oxide layer on said material layer;
   (c) immersing said oxide layer in a dilute solution of potassium permanganate;
   (d) acidifying said solution by adding thereto an oxidizing acid having the general formula $HNO_x$, said acid being incapable of reacting with manganese oxide, said acidification effecting reduction and precipitation of a high oxidation state manganese oxide layer onto said oxide layer;
   (e) agitating said acidified solution during said reduction and precipitation; and then
   (f) depositing a conductive layer upon and in intimate contact with said manganese oxide layer.

8. The process of claim 7 wherein the general formula $HNO_x$, $x$ is a whole number in the range 2 to 3.

9. The process of claim 7 wherein steps (c)–(e) are carried out at room temperature.

References Cited

UNITED STATES PATENTS

| 2,993,266 | 7/1961 | Berry. | |
| 3,093,883 | 6/1963 | Haring et al. | 317—230 |
| 3,254,390 | 6/1966 | Shtasel | 317—230 |
| 3,320,484 | 5/1967 | Riley et al. | 317—230 |
| 3,156,633 | 11/1964 | Olson et al. | 204—38 |
| 3,166,693 | 1/1965 | Haring et al. | 317—230 |

JAMES D. KALLAM, *Primary Examiner.*